(12) United States Patent
Zheng

(10) Patent No.: US 10,996,397 B2
(45) Date of Patent: May 4, 2021

(54) CONTROL SYSTEMS AND METHODS FOR ALIGNING MULTIMODE OPTICAL FIBERS

(71) Applicant: AFL Telecommunications LLC, Duncan, SC (US)

(72) Inventor: Wenxin Zheng, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/870,049

(22) Filed: May 8, 2020

(65) Prior Publication Data

US 2020/0355878 A1 Nov. 12, 2020

Related U.S. Application Data

(60) Provisional application No. 62/845,591, filed on May 9, 2019.

(51) Int. Cl.
*G02B 6/255* (2006.01)
*G02B 6/38* (2006.01)
*G02B 6/42* (2006.01)

(52) U.S. Cl.
CPC ......... *G02B 6/2555* (2013.01); *G02B 6/3885* (2013.01); *G02B 6/4221* (2013.01); *G02B 6/4227* (2013.01)

(58) Field of Classification Search
CPC ........ G02B 6/24; G02B 6/241; G02B 6/2551; G02B 6/2555; G02B 6/3846; G02B 6/3885; G02B 6/422; G02B 6/4221; G02B 6/4227

USPC ........ 385/31, 38, 39, 50, 52, 59, 95–98, 134
See application file for complete search history.

(56) References Cited

U.S. PATENT DOCUMENTS

2003/0044141 A1* 3/2003 Melton ................ G02B 6/4472
385/114

* cited by examiner

*Primary Examiner* — Michael P Mooney
(74) *Attorney, Agent, or Firm* — Dority & Manning, P.A.

(57) ABSTRACT

Control systems and methods for aligning multimode optical fibers are provided. A method includes producing a brightness profile for a first and second multimode optical fiber. The method further includes determining a cladding center position and a core center position from the brightness profile of the first multimode optical fiber and from the brightness profile of the second multimode optical fiber. The method further includes calculating a concentricity error for the first multimode optical fiber based on the cladding center position and the core center position from the brightness profile of the first multimode optical fiber and for the second multimode optical fiber based on the cladding center position and the core center position from the brightness profile of the second multimode optical fiber. The method further includes aligning the first multimode optical fiber and the second multimode optical fiber based on the concentricity errors of the first multimode optical fiber and second multimode optical fiber.

20 Claims, 6 Drawing Sheets

CONTROL SYSTEMS AND METHODS FOR ALIGNING MULTIMODE OPTICAL FIBERS

PRIORITY STATEMENT

The present application claims priority to U.S. Provisional Patent Application No. 62/845,591 filed May 9, 2019, the disclosure of which is incorporated by reference herein in its entirety.

FIELD

The present disclosure relates generally to control systems and methods for aligning multimode optical fibers.

BACKGROUND

Advances in fiber and glass processing technology have been driven by a demand for high quality optical fiber components for a variety of applications. For example, in recent years, $CO_2$ laser-based glass processing machines played a key role in enabling a new generation of optical fibers. One key to the deployment of a network of optical fibers is the necessity of splicing together optical fibers along the network. Accurate splicing of the optical fibers is key to efficient light transmission and the resulting functionality of the network.

For optical fibers to be spliced accurately, the optical fibers to be spliced must be accurately and precisely aligned with respect to each other. More specifically, the ends of the optical fibers to be spliced together must be aligned along an X-axis and Y-axis, both of which are perpendicular to the longitudinal axes of the optical fibers. It is critical that the cores of the optical fibers are aligned in order to prevent the loss of light from the core at the splice point.

Methods and apparatus for aligning the claddings of optical fibers is existing technology (e.g. for most field splicers in the world). Further, core alignment for single-mode optical fibers ("SMFs") is existing technology (e.g. for most factory splicers). However, core alignment for multi-mode optical fibers ("MMFs") does not yet exist. As multimode optical fibers are increasingly utilized with high powered light sources such as high powered lasers, such core alignment has become both desirable and critical to the use of multimode optical fibers.

Accordingly, methods and apparatus for facilitating the core alignment of multimode optical fibers would be advantageous.

BRIEF DESCRIPTION

Aspects and advantages of the control systems and methods in accordance with the present disclosure will be set forth in part in the following description, or may be obvious from the description, or may be learned through practice of the technology.

In accordance with one embodiment, a method for aligning a first multimode optical fiber and a second multimode optical fiber is provided. The first multimode optical fiber and second multimode optical fiber each include a core and a cladding. The method includes producing a brightness profile for the first multimode optical fiber and for the second multimode optical fiber. The method further includes determining a cladding center position and a core center position from the brightness profile of the first multimode optical fiber and from the brightness profile of the second multimode optical fiber. The method further includes calculating a concentricity error for the first multimode optical fiber based on the cladding center position and the core center position from the brightness profile of the first multimode optical fiber and for the second multimode optical fiber based on the cladding center position and the core center position from the brightness profile of the second multimode optical fiber. The method further includes aligning the first multimode optical fiber and the second multimode optical fiber based on the concentricity errors of the first multimode optical fiber and second multimode optical fiber.

In accordance with another embodiment, a control system for aligning a first multimode optical fiber and a second multimode optical fiber is provided. The first multimode optical fiber and second multimode optical fiber each include a core and a cladding. The control system includes a light source, a camera, and an alignment platform. The alignment platform includes a first component on which the first multimode optical fiber is disposed and a second component on which the second multimode optical fiber is disposed. One or more of the first component or the second component is movable to align the first multimode optical fiber and second multimode optical fiber. The control system further includes a controller in communication with the light source, the camera, and the alignment platform.

The control system may be operable to perform, or cause to be performed, one or more steps for aligning the first multimode optical fiber and second multimode optical fiber. For example, in accordance with one embodiment, the control system is operable to produce a brightness profile for the first multimode optical fiber and for the second multimode optical fiber. In accordance with one embodiment, the control system is further operable to determine a cladding center position and a core center position from the brightness profile of the first multimode optical fiber and from the brightness profile of the second multimode optical fiber. In accordance with one embodiment, the control system is further operable calculate a concentricity error for the first multimode optical fiber based on the cladding center position and the core center position from the brightness profile of the first multimode optical fiber and for the second multimode optical fiber based on the cladding center position and the core center position from the brightness profile of the second multimode optical fiber. In accordance with one embodiment, the control system is further operable to align the first multimode optical fiber and the second multimode optical fiber based on the concentricity errors of the first multimode optical fiber and second multimode optical fiber.

These and other features, aspects and advantages of the present control systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present control systems and methods, including the best mode of making and using the present systems and methods, directed to one of ordinary skill in the art, is set forth in the specification, which makes reference to the appended figures, in which.

DETAILED DESCRIPTION

Figure 1:
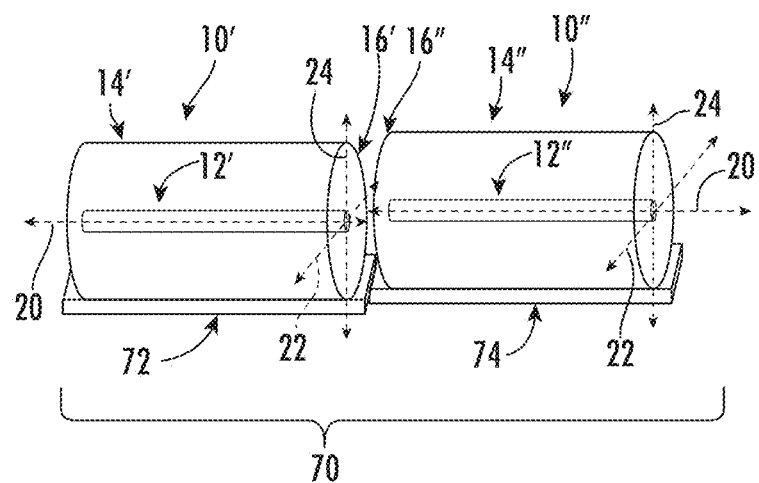
FIG. 1 illustrates MMFs in a control system for alignment in accordance with embodiments of the present disclosure.

Reference now will be made in detail to embodiments of the present control systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to FIGS. 1 through 7, methods and control systems for aligning multimode optical fibers ("MMFs") 10 are provided. More specifically, methods and control systems for aligning a first MMF 10' and a second MMF 10" are provided. Such methods and control systems advantageously provide for precise, accurate alignment of the cores 12 of such MMFs, which in turn facilitates optical fiber processing activities such as splicing, etc.

FIG. 1 illustrates a first MMF 10' and a second MMF 10". Each MMF includes a core 12 (12' and 12" respectively for first and second MMF 10', 10") surrounded by a cladding 14 (14' and 14" respectively for first and second MMF 10', 10"), as is generally understood. One or more coating layers (not shown) may surround the cladding 14. Ends 16 (16' and 16" respectively for first and second MMF 10', 10") of the MMFs 10 are shown in FIG. 1. Methods and control systems in accordance with the present disclosure facilitate alignment of such ends 16, such as of the cores 12 at such ends 16.

Each MMF may extend generally along a longitudinal axis 20, and an X-axis 22 and Y-axis 24 may be defined for each MMF. The axes 20, 22, 24 may be mutually orthogonal, such that the X-axis 22 and Y-axis 24 are perpendicular to each other and to the longitudinal axis 20. Alignment of the optical fibers 10, such as of the cores 12 at ends 16, may be along one or more of the X-axis 22 or Y-axis 24, such as in exemplary embodiments along both the X-axis and Y-axis 24.

Figure 2:
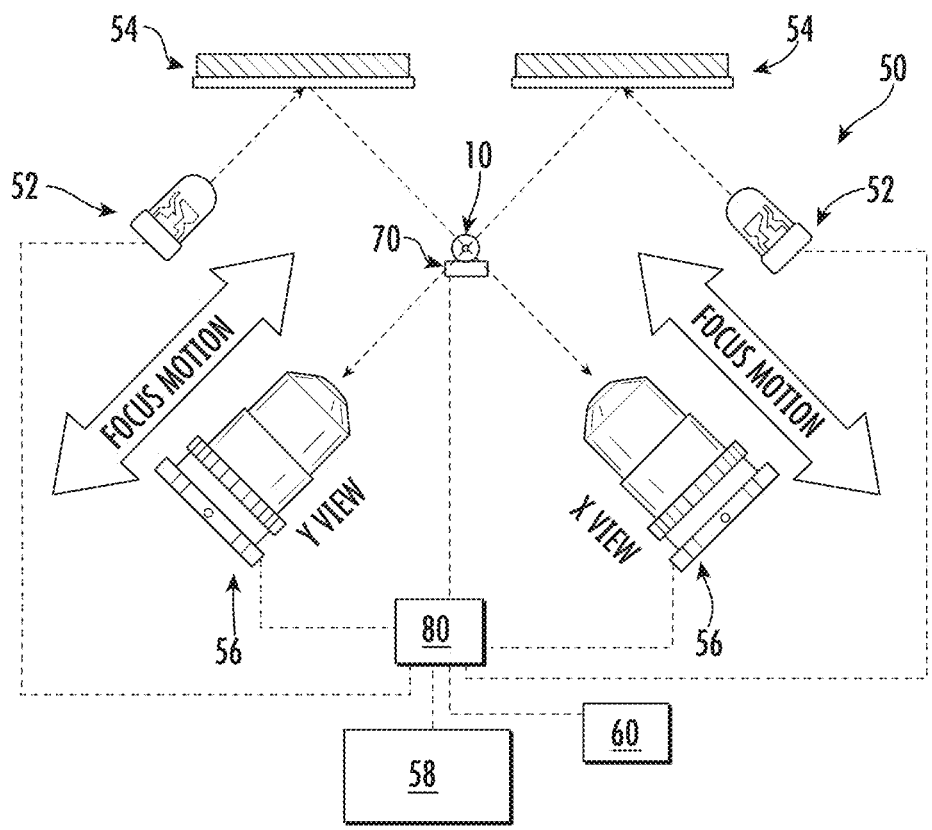
FIG. 2 illustrates a control system in accordance with embodiments of the present disclosure.
Figure 3:
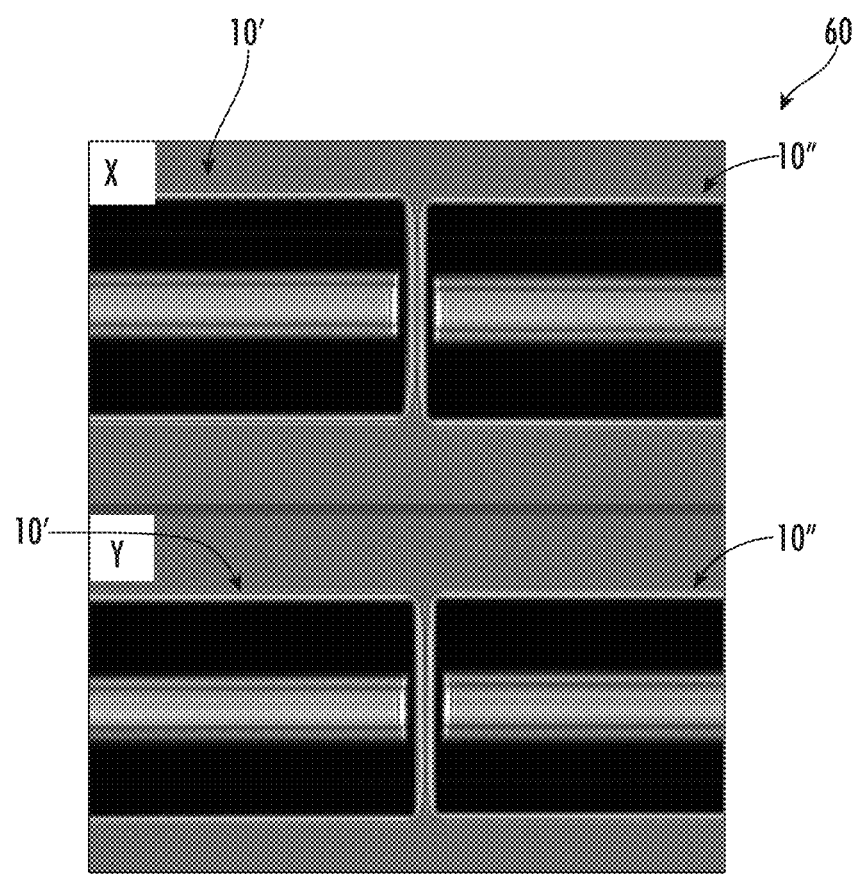
FIG. 3 illustrates an output displayed by a control system in accordance with embodiments of the present disclosure.

Referring now to FIGS. 1 through 3, embodiments of control systems 50 for use in accordance with the present disclosure are provided. Control systems 50 may be utilized to align MMFs 10 in accordance with the present disclosure. A control system 50 may include, for example, one or more light sources 52. In exemplary embodiments, the light sources 52 may be light emitting diodes ("LEDs") or other suitable sources of light. The light sources 52 may generally emit light which is directed to, through, and/or past the MMFs 10 in order to facilitate the generation of brightness profiles for the MMFs 10, which in turn facilitates alignment of the MMFs 10. A control system 50 may further include, for example, one or more mirrors 54. Mirrors 54 may reflect the light emitted by light sources 52 such that the light is directed to, through, and/or past the MMFs 10. A control system 50 may further include, for example, one or more cameras 56. Cameras 56 may capture images of the MMFs which may be utilized during alignment of the MMFs. Suitable cameras 56 may be, for example, CMOS or CCD cameras 56. Cameras 56 may be directed towards the MMFs 10 such that the MMFs 10 (in exemplary embodiments at or near the ends 16 thereof) are visible through the cameras 56. One or more cameras 56 may be directed towards each MMF 10', 10". In exemplary embodiments, at least two cameras 56 are directed towards each MMF 10', 10". The cameras 56 may be oriented generally perpendicular to each other, such that one camera 56 captures images along the X-axis 22 and the other camera 56 captures images along the Y-axis 24.

A control system 50 in accordance with the present disclosure may further include a display 58. Display 58 may output images for a user to view during operation of the control system 50. For example, display 58 may be connected to the camera(s) 56 and/or other components of the control system 50. In exemplary embodiments, images captured by the camera(s) 56 are output to the display for user viewing purposes.

A control system 50 in accordance with the present disclosure may further include one or more user input controls 60. User input controls 60 may be, for example, buttons, knobs, levers, switches, etc., which allow a user to input commands to the control system 50. User input controls 60 may be connected to one or more other components of the control system 50, such as the light source(s) 52, camera(s) 56, display 58, alignment platform 70, controller 80, etc.

A control system 50 may further include an alignment platform 70. Alignment platform 70 may include a first component 72 on which the first MMF 10' is disposed and a second component 74 on which the second MMF 10" is disposed. The first component 72 and second component 74 may be or include, for example, fiber clamps or other suitable apparatus for securing the MMFs 10. One or both of the first component 72 or second component 74 may be moveable to align the first MMF 10' and second MMF 10". Such movement may be along the X-axis 22 and/or Y-axis 24. In exemplary embodiments, both first MMF 10' and second MMF 10" are movable along the X-axis 22 and Y-axis 24.

Control system 50 may further include other components, or may be part of an assembly or system, which provide additional or alternative functionalities or processes. For example, control system 50 may include components for splicing or be part of a splicer apparatus, such that a heat source (such as a $CO_2$ laser or electric arc) is included.

Control system 50 may further include a controller 80. Controller may be in communication with one or more of the other control system 50 components, such as the light source 52, mirrors 54, cameras 56, display 58, user input controls 60, alignment platform 70 (such as the first and second components 62, 64), etc. Controller 80 may generally be operable to operate or receive input from such components in accordance with embodiments of the present disclosure, as discussed herein. In particular, controller 80 may be operable to perform the various method steps for aligning first and second MMFs 10', 10" as discussed herein.

The controller 80 may include a memory and microprocessor, such as a general or special purpose microprocessor operable to execute programming instructions or microcontrol code associated with processing of signals from the light source 52, mirrors 54, cameras 56, display 58, user input controls 60, alignment platform 70 (such as the first and second components 62, 64), etc. The memory may represent random access memory such as DRAM, or read only memory such as ROM or FLASH. In one embodiment, the processor executes programming instructions stored in memory. The memory may be a separate component from the processor or may be included onboard within the processor.

Referring now additionally to FIGS. 4 through 7, the present disclosure is further directed to methods for aligning MMFs 10, and more specifically to aligning the cores 12', 12" of a first MMF 10' and a second MMF 10". In exemplary embodiments, one or more methods steps as discussed herein may be performed by the control system 50, such as via input to and output from the controller 80 thereof.

A method in accordance with the present disclosure may include, for example, the step of producing a brightness profile 100 for each MMF 10 to be aligned, such as for the first MMF 10' and the second MMF 10". The brightness profile 100 may, for example, be produced by the control system 50. For example, a camera 56 may capture an image of an MMF. The image may be taken when emitted light 53 from a light source 52 is being directed through the MMF. Such image may constitute the brightness profile 100. In exemplary embodiments, brightness profiles 100 may be output to display 58.

In exemplary embodiments, the brightness profile 100 may illustrate cladding edges 102, cladding diffraction lines 104, and core diffraction lines 106, as illustrated. A focal plane 57 of the camera may be adjusted prior to capturing the image such that the cladding edges 102, cladding diffraction lines 104, and core diffraction lines 106 are visible in the brightness profile 100.

Figure 4:
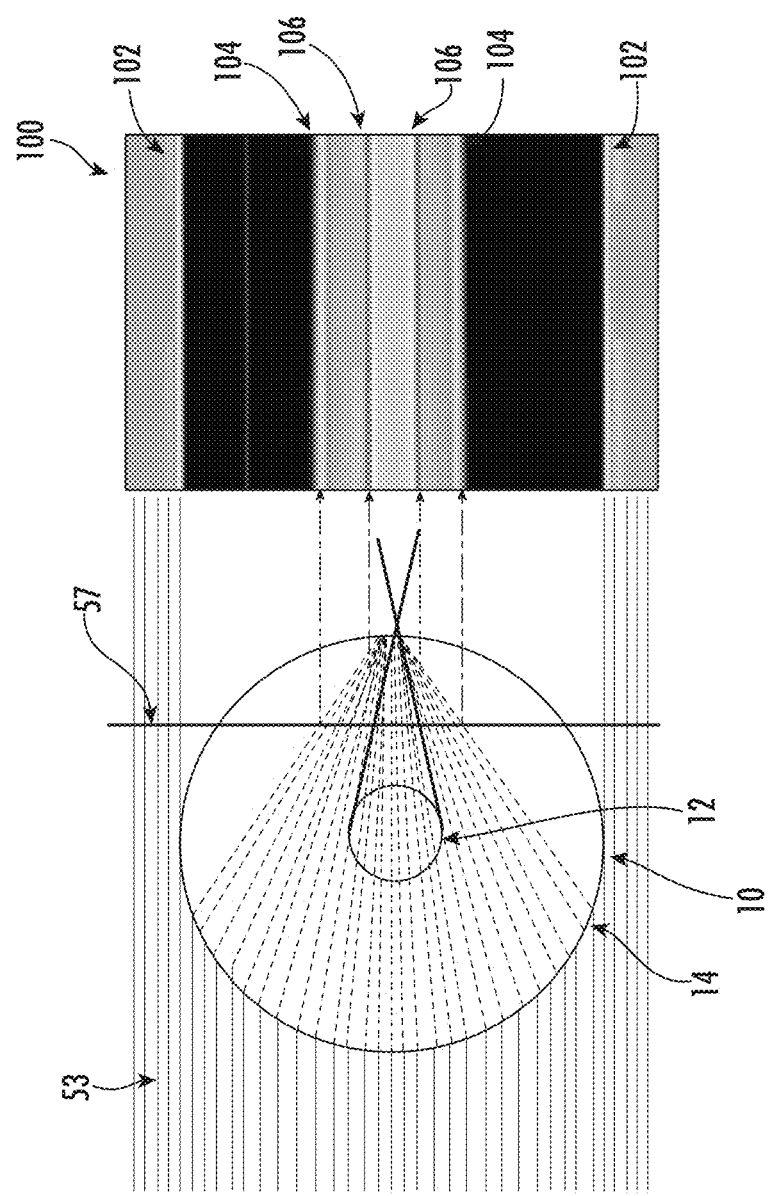
FIG. 4 schematically illustrates operation of a country system to produce a brightness profile for an MMF in accordance with embodiments of the present disclosure.

The brightness profiles 100 of the MMFs 10 may be take on lines perpendicular to the longitudinal axes 20 of the MMFs 10. For example, brightness profiles 100 may be taken along the X-axis 22 and/or along the Y-axis 24. While FIG. 4 illustrates a brightness profile 100 taken along a Y-axis 24, it should be understood that the concept illustrated in FIG. 4 and discussed herein may equally apply to obtain a brightness profile 100 along the X-axis 22.

A method in accordance with the present disclosure may further include, for example, the step of determining a cladding center position ("Clad") and a core center position ("Core") from the brightness profiles 100 of the MMFs 10. In exemplary embodiments, the Clad and Core are determined via analysis of the brightness profiles 100 of the MMFs 10, such as graphical analysis of the pixel brightness in the images utilized as the brightness profiles 100.

Figure 5:
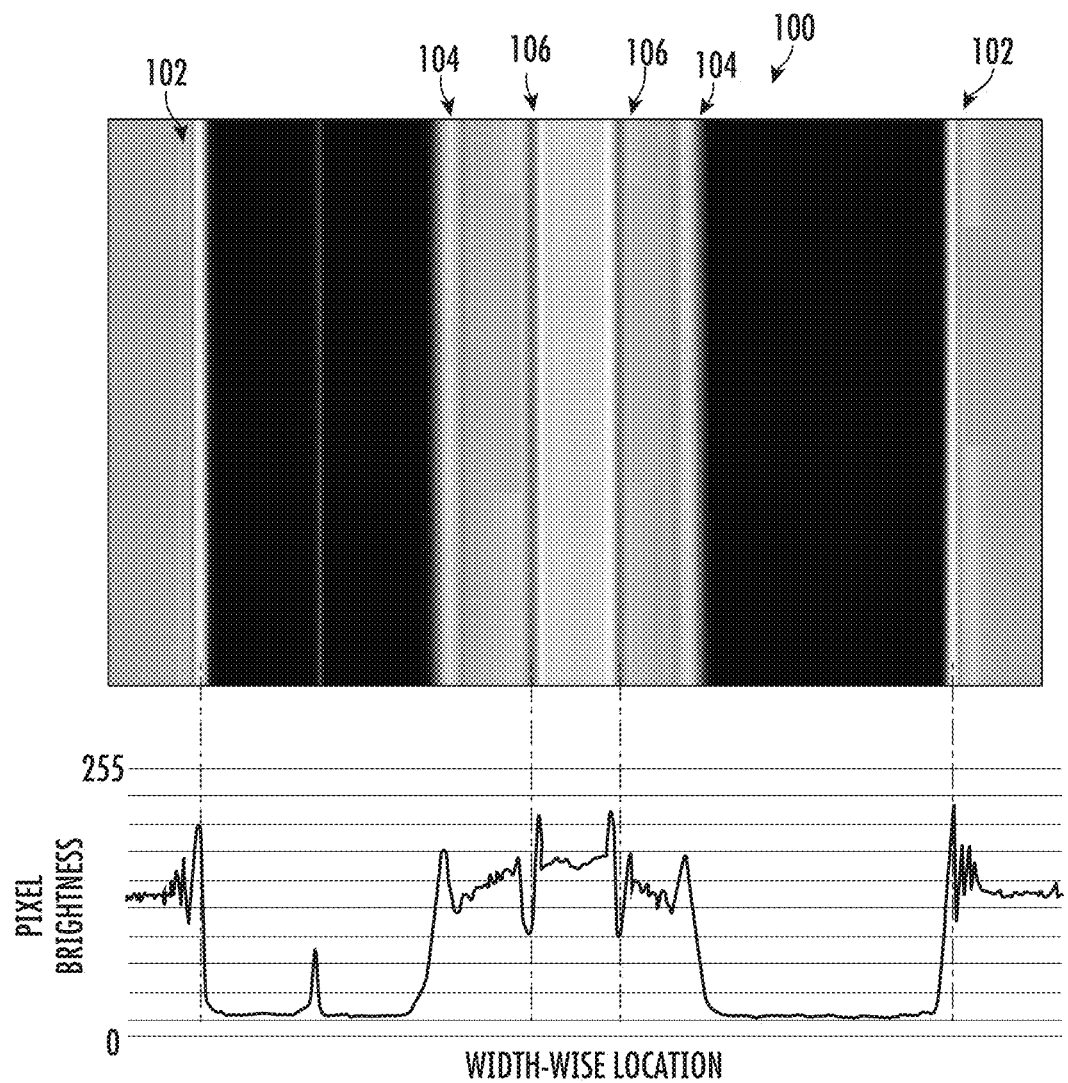
FIG. 5 illustrates a graph of a brightness profile for an MMF in accordance with embodiments of the present disclosure.
Figure 6:
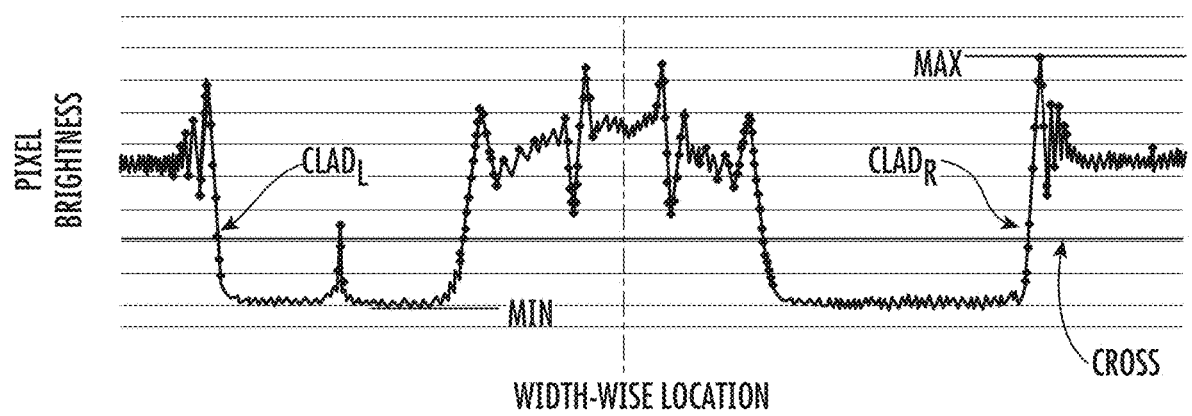
FIG. 6 illustrates a graphical analysis utilized to determine a cladding center position in accordance with embodiments of the present disclosure.
Figure 7:
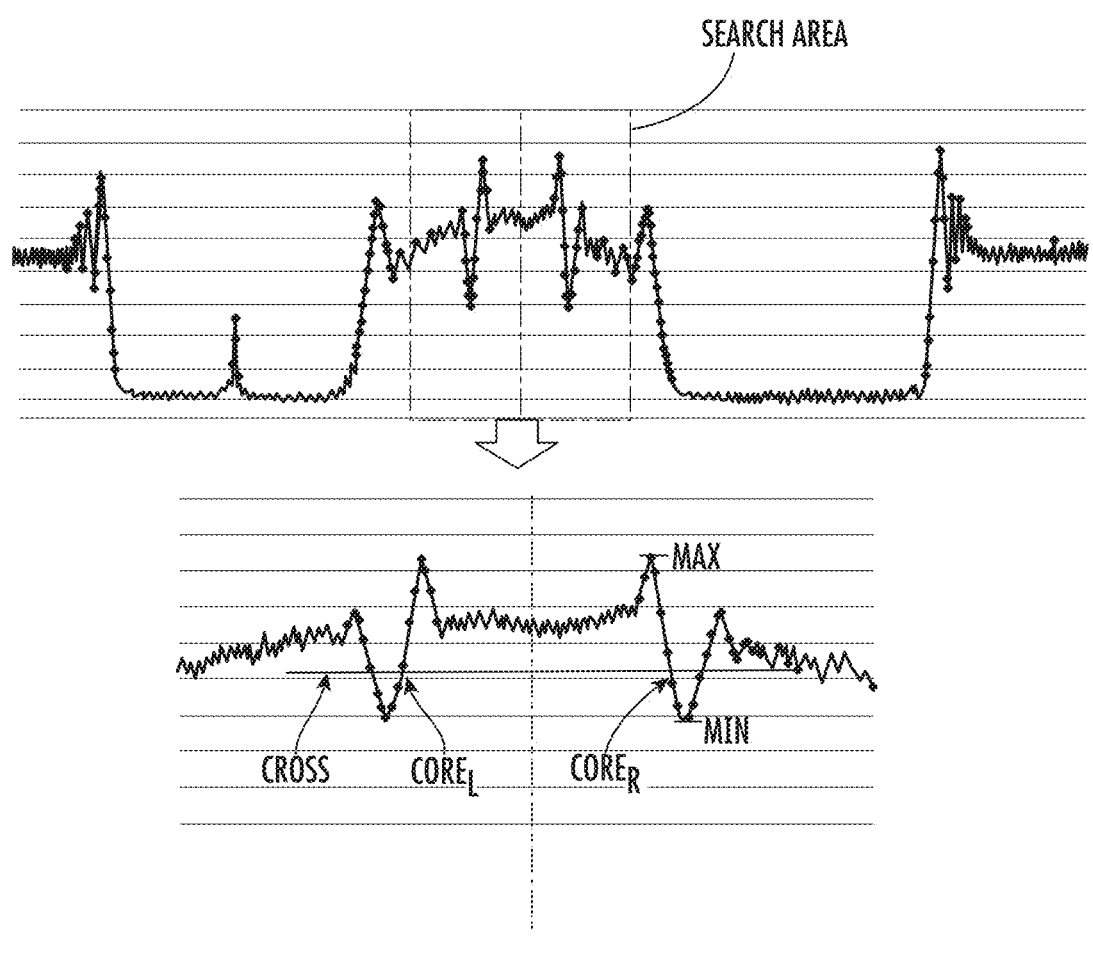
FIG. 7 illustrates a graphical analysis utilized to determine a core center position in accordance with embodiments of the present disclosure.

For example, FIG. 5 illustrates a brightness profile 100 and a graph of pixel brightness versus location along an axis 22, 24 (e.g. a width-wise location along the MMF 10). The dotted lines illustrate the locations of the cladding edges and core diffraction lines. FIG. 6 provides a graphical representation of the analysis of such graph to determine the Clad from the brightness profile 100. FIG. 7 provides a graphical representation of the analysis of such graph to determine the Core from the brightness profile 100.

Determining the Clad may include, for example, detecting a maximum value ("max") and a minimum value ("min") in the brightness profile 100. The max and min represent maximum and minimum pixel brightness values for the brightness profile 100. Determining the Clad may further include for example, calculating a cross line value ("cross") based on the following equation:

$$\text{cross} = \frac{(\max - \min)}{Fclad} + \min$$

wherein Fclad is a numerical factor greater than 1. The Fclad is a factor which is determined such that the number of cross points for a cross line drawn at the cross line value, e.g. locations wherein the cross line crosses/intersects the graphed brightness profile. By minimizing the number of cross points, noise in the Clad determination may be reduced. The cross line value is a brightness value, and the cross line is a line along the location axis at the cross line value.

Determining the Clad may further include, for example, determining a left cladding value ("$Clad_L$") and a right cladding value ("$Clad_R$") based on the cross line value. For example, a cross line may be drawn at the cross line value as discussed, and the cross line may intersect with the graphed brightness profile. A location axis value at an intersection which is, in the graphical representation, proximate the left cladding edge of the brightness profile 100, may be chosen as $Clad_L$. A location axis value at an intersection which is, in the graphical representation, proximate the right cladding edge of the brightness profile 100, may be chosen as $Clad_R$. In the case that an intersection with the cross line is between two pixel values, $Clad_L$ and/or $Clad_R$ may be determined via a linear interpolation of the two adjacent pixel values, calculation from a curve fitting the two adjacent pixel values, or another suitable calculation.

Determining the Clad may further include, for example, calculating the Clad based on the following equation:

$$\text{Clad} = \frac{(\text{Clad}_L + \text{Clad}_R)}{2}$$

Determining the Core may include, for example, defining a search area within the brightness profile. The search area may be an area of the brightness profile which is restricted in the location axis direction to between the cladding diffraction lines. Determining the Core may further include detecting a maximum value ("max") and a minimum value ("min") in the search area. The max and min represent maximum and minimum pixel brightness values for the search area. Determining the Core may further include for example, calculating a cross line value ("cross") based on the following equation:

$$\text{cross} = \frac{(\text{max} - \text{min})}{F\text{core}} + \text{min}$$

wherein Fcore is a numerical factor greater than 1. The Fcore is a factor which is determined such that the number of cross points for a cross line drawn at the cross line value, e.g. locations wherein the cross line crosses/intersects the graphed search area portion of the brightness profile. By minimizing the number of cross points, noise in the Core determination may be reduced. The cross line value is a brightness value, and the cross line is a line along the location axis at the cross line value.

Determining the Core may further include, for example, determining a left core value ("$\text{Core}_L$") and a right core value ("$\text{Core}_R$") based on the cross line value. For example, a cross line may be drawn at the cross line value as discussed, and the cross line may intersect with the search area of the graphed brightness profile. A location axis value at an intersection which is, in the graphical representation, proximate the left core edge of the brightness profile 100, may be chosen as $\text{Core}_L$. A location axis value at an intersection which is, in the graphical representation, proximate the right core edge of the brightness profile 100, may be chosen as $\text{Core}_R$. In the case that an intersection with the cross line is between two pixel values, $\text{Core}_L$ and/or $\text{Core}_R$ may be determined via a linear interpolation of the two adjacent pixel values, calculation from a curve fitting the two adjacent pixel values, or another suitable calculation.

Determining the Core may further include, for example, calculating the Core based on the following equation:

$$\text{Core} = \frac{(\text{Core}_L + \text{Core}_R)}{2}$$

Determining the Clad and Core may be performed for both the first MMF 10' and the second MMF 10".

A method in accordance with the present disclosure may further include calculating a concentricity error ("CE") for the first MMF 10' based on the Clad and the Core from the brightness profile of the first MMF 10' and for the second MMF 10" based on the Clad and the Core from the brightness profile of the second MMF 10". Concentricity error is generally the distance between the Clad and the Core. In exemplary embodiments, the concentricity error is calculated based on the following equation:

$$\text{CE} = \text{Clad} - \text{Core}$$

Accordingly, a first concentricity error $\text{CE}_1$ of the first MMF 10' and a second concentricity error $\text{CE}_2$ of the second MMF 10" may be calculated.

It should be noted that the steps of producing a brightness profile, determining a cladding center position and a core center position, and calculating a concentricity error may each be performed on the X-axis 22 and/or the Y-axis of the first MMF 10' and the second MMF 10". Accordingly, the variables and results as discussed herein, such as the Clad, Core, and CE for each MMF 10', may be provided on the X-axis 22 and/or the Y-axis. In exemplary embodiments, the steps as discussed herein may be performed on both the X-axis 22 and the Y-axis of the first MMF 10' and the second MMF 10".

A method in accordance with the present disclosure may further include aligning the first MMF 10' and the second MMF 10" based on the concentricity errors of the first MMF 10' and the second MMF 10", e.g. $\text{CE}_1$ and $\text{CE}_2$. The aligning step may occur along the X-axis 22 and/or the Y-axis 24 of the first MMF 10' and the second MMF 10", such that the first MMF 10' and second MMF 10" are aligned along the X-axes 22 and/or Y-axes 24 thereof. For example, if the steps of producing a brightness profile, determining a cladding center position and a core center position, and calculating a concentricity error are performed along the X-axes 22, then alignment may be performed along the X-axes 22. If the steps of producing a brightness profile, determining a cladding center position and a core center position, and calculating a concentricity error are performed along the Y-axes 22, then alignment may be performed along the Y-axes 24. If the steps of producing a brightness profile, determining a cladding center position and a core center position, and calculating a concentricity error are performed along the X-axes 22 and Y-axes 24, then alignment may be performed along the X-axes 22 and Y-axes.

As discussed, aligning of the first MMF 10' and the second MMF 10" may be based on the concentricity errors of the first MMF 10' and the second MMF 10", e.g. $\text{CE}_1$ and $\text{CE}_2$. For example, the aligning step may include calculating an offset value ("OV") between the first MMF 10' and second MMF 10". The offset value is generally a difference between the concentricity errors of the first and second MMFs 10', 10", and may for example be calculated based on the following equation:

$$\text{OV} = \text{CE}_1 - \text{CE}_2$$

In some embodiments, the calculated offset value is utilized to move the first MMF 10' and/or second MMF 10" into alignment, as discussed herein. In other embodiments, the calculated offset value is adjusted based on an eccentricity correction factor ("ECF"), and the offset value after adjustment is utilized to move the first MMF 10' and/or second MMF 10" into alignment. The ECF is a factor that is utilized to compensate for the surface tension effect during heating of the first MMF 10' and/or second MMF 10" when the first MMF 10' and/or second MMF 10" are subsequently processed, such as spliced together. Adjustment of the calculated offset value may be performed by multiplying the calculated offset value by the ECF.

Aligning of the first MMF 10' and the second MMF 10" may further include moving the first MMF 10' and/or second MMF 10" until an offset between the first multimode optical fiber or second multimode optical fiber corresponds to the offset value. Such movement and offset may be along the X-axes 22 and/or Y-axes 24 of the first MMF 10' and second MMF 10", as discussed herein. Movement of the first MMF 10' and second MMF 10" may be caused by movement of the alignment platform 70, such as the first component 72 to which the first MMF 10' is secured and/or second component 74 to which the second MMF 10" is secured as discussed herein. Such movement may be performed automatically via input from the controller 80 to the alignment platform 70, or may be performed manually by a user via user input controls 60, from which input signals may be routed through controller 80 to the alignment platform 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for aligning a first multimode optical fiber and a second multimode optical fiber, the first multimode optical fiber and second multimode optical fiber each comprising a core and a cladding, the method comprising:
    producing a brightness profile for the first multimode optical fiber and for the second multimode optical fiber;
    determining a cladding center position and a core center position from the brightness profile of the first multimode optical fiber and from the brightness profile of the second multimode optical fiber;
    calculating a concentricity error for the first multimode optical fiber based on the cladding center position and the core center position from the brightness profile of the first multimode optical fiber and for the second multimode optical fiber based on the cladding center position and the core center position from the brightness profile of the second multimode optical fiber;
    aligning the first multimode optical fiber and the second multimode optical fiber based on the concentricity errors of the first multimode optical fiber and second multimode optical fiber.

2. The method of claim 1, wherein the brightness profiles are taken on lines perpendicular to longitudinal axes of the first multimode optical fiber and second multimode optical fiber, respectively.

3. The method of claim 1, wherein the first multimode optical fiber and the second multimode optical fiber are aligned along one or more of an X-axis or a Y-axis, wherein the X-axis and the Y-axis are perpendicular to longitudinal axes of the first multimode optical fiber and second multimode optical fiber.

4. The method of claim 1, wherein the steps of producing a brightness profile, determining a cladding center position and a core center position, and calculating a concentricity error are performed on an X-axis and a Y-axis of the first multimode optical fiber and second multimode optical fiber, wherein the X-axis and the Y-axis are perpendicular to longitudinal axes of the first multimode optical fiber and second multimode optical fiber.

5. The method of claim 1, wherein determining the cladding center position comprises:
    detecting a maximum value ("max") and a minimum value ("min") in the brightness profile;
    calculating a cross line value ("cross") based on the following equation:

$$\text{cross} = \frac{(\max - \min)}{Fclad} + \min$$

wherein Fclad is a numerical factor greater than 1;
    determining a left cladding value ("$\text{Clad}_L$") and a right cladding value ("$\text{Clad}_R$") based on the cross line value; and
    calculating the cladding center position ("Clad") based on the following equation:

$$\text{Clad} = \frac{(\text{Clad}_L + \text{Clad}_R)}{2}.$$

6. The method of claim 1, wherein determining the core center position comprises:
    defining a search area within the brightness profile;
    detecting a maximum value ("max") and a minimum value ("min") in the search area;
    calculating a cross line value ("cross") based on the following equation:

$$\text{cross} = \frac{(\max - \min)}{Fcore} + \min$$

wherein Fcore is a numerical factor greater than 1;
    determining a left core value ("$\text{Core}_L$") and a right core value ("$\text{Core}_R$") based on the cross line value; and
    calculating the core center position ("Core") based on the following equation:

$$\text{Core} = \frac{(\text{Core}_L + \text{Core}_R)}{2}.$$

7. The method of claim 1, wherein the concentricity error is calculated based on the following equation:

CE=Clad−Core wherein CE is the concentricity error, Clad is the cladding center position, and Core is the core center position.

8. The method of claim 1, wherein aligning the first multimode optical fiber and the second multimode optical fiber comprises:
    calculating an offset value between the first multimode optical fiber and second multimode optical fiber; and
    moving one or more of the first multimode optical fiber or second multimode optical fiber until an offset between the first multimode optical fiber or second multimode optical fiber corresponds to the offset value.

9. The method of claim 8, wherein the offset value is calculated based on the following equation:

OV=$CE_1$−$CE_2$ wherein OV is the offset value, $CE_1$ is the concentricity error of the first multimode optical fiber, and $CE_2$ is the concentricity error of the second multimode optical fiber.

10. The method of claim 8, further comprising adjusting the offset value based on an eccentricity correction factor, and wherein the moving step is performed based on the offset value after adjustment.

11. A control system for aligning a first multimode optical fiber and a second multimode optical fiber, the first multimode optical fiber and second multimode optical fiber each comprising a core and a cladding, the control system comprising:
- a light source;
- a camera;
- an alignment platform comprising a first component on which the first multimode optical fiber is disposed and a second component on which the second multimode optical fiber is disposed, wherein one or more of the first component or the second component is movable to align the first multimode optical fiber and second multimode optical fiber; and
- a controller in communication with the light source, the camera, and the alignment platform, the controller operable to:
  - produce a brightness profile for the first multimode optical fiber and for the second multimode optical fiber;
  - determine a cladding center position and a core center position from the brightness profile of the first multimode optical fiber and from the brightness profile of the second multimode optical fiber;
  - calculate a concentricity error for the first multimode optical fiber based on the cladding center position and the core center position from the brightness profile of the first multimode optical fiber and for the second multimode optical fiber based on the cladding center position and the core center position from the brightness profile of the second multimode optical fiber; and
  - align the first multimode optical fiber and the second multimode optical fiber based on the concentricity errors of the first multimode optical fiber and second multimode optical fiber.

12. The control system of claim 11, wherein the brightness profiles are taken on lines perpendicular to longitudinal axes of the first multimode optical fiber and second multimode optical fiber, respectively.

13. The control system of claim 11, wherein the first multimode optical fiber and the second multimode optical fiber are aligned along one or more of an X-axis or a Y-axis, wherein the X-axis and the Y-axis are perpendicular to longitudinal axes of the first multimode optical fiber and second multimode optical fiber.

14. The control system of claim 11, wherein the steps of producing a brightness profile, determining a cladding center position and a core center position, and calculating a concentricity error are performed on an X-axis and a Y-axis of the first multimode optical fiber and second multimode optical fiber, wherein the X-axis and the Y-axis are perpendicular to longitudinal axes of the first multimode optical fiber and second multimode optical fiber.

15. The control system of claim 11, wherein determining the cladding center position comprises:
- detecting a maximum value ("max") and a minimum value ("min") in the brightness profile;
- calculating a cross line value ("cross") based on the following equation:

$$\text{cross} = \frac{(\text{max} - \text{min})}{Fclad} + \text{min}$$

wherein Fclad is a numerical factor greater than 1;
- determining a left cladding value ("Clad$_L$") and a right cladding value ("Clad$_R$") based on the cross line value; and
- calculating the cladding center position ("Clad") based on the following equation:

$$\text{Clad} = \frac{(\text{Clad}_L + \text{Clad}_R)}{2}.$$

16. The control system of claim 11, wherein determining the core center position comprises:
- defining a search area within the brightness profile;
- detecting a maximum value ("max") and a minimum value ("min") in the search area;
- calculating a cross line value ("cross") based on the following equation:

$$\text{cross} = \frac{(\text{max} - \text{min})}{Fcore} + \text{min}$$

wherein Fcore is a numerical factor greater than 1;
- determining a left core value ("Core$_L$") and a right core value ("Core$_R$") based on the cross line value; and
- calculating the core center position ("Core") based on the following equation:

$$\text{Core} = \frac{(\text{Core}_L + \text{Core}_R)}{2}.$$

17. The control system of claim 11, wherein the concentricity error is calculated based on the following equation:

CE=Clad−Core wherein CE is the concentricity error, Clad is the cladding center position, and Core is the core center position.

18. The control system of claim 11, wherein aligning the first multimode optical fiber and the second multimode optical fiber comprises:
- calculating an offset value between the first multimode optical fiber and second multimode optical fiber; and
- moving one or more of the first multimode optical fiber or second multimode optical fiber until an offset between the first multimode optical fiber or second multimode optical fiber corresponds to the offset value.

19. The control system of claim 18, wherein the offset value is calculated based on the following equation:

OV=CE$_1$−CE$_2$ wherein OV is the offset value, CE$_1$ is the concentricity error of the first multimode optical fiber, and CE$_2$ is the concentricity error of the second multimode optical fiber.

20. The control system of claim 18, further comprising adjusting the offset value based on an eccentricity correction factor, and wherein the moving step is performed based on the offset value after adjustment.

* * * * *